INVENTOR.
SHOLLY KAGAN
BY *Brown and Mikulka and James E. Mrose*
ATTORNEYS

INVENTOR.
SHOLLY KAGAN
BY Brown and Mikulka
and
James E. Mrose
ATTORNEYS

INVENTOR.
SHOLLY KAGAN
BY Brown and Mikulka
and
James E. Mrose
ATTORNEYS

INVENTOR.
SHOLLY KAGAN
BY *Brown and Mikulka*
*and*
*James E. Mrose*
ATTORNEYS

United States Patent Office 3,396,233

Patented Aug. 6, 1968

3,396,233

HIGH-VOLTAGE SWITCHING FOR TWO-COLOR LINE-SEQUENTIAL COLOR TELEVISION

Sholly Kagan, Natick, Mass., assignor to Polaroid Corporation, Cambridge, Mass., a corporation of Delaware Filed Feb. 7, 1966, Ser. No. 525,497

23 Claims. (Cl. 178—5.4)

ABSTRACT OF THE DISCLOSURE

In an accelerating high-voltage dependent two-color television receiver there is incorporated a synchronizing signal responsive resonant circuit means to alternately produce nonsymmetrical high voltage pulses for color alternation.

Figure 1:
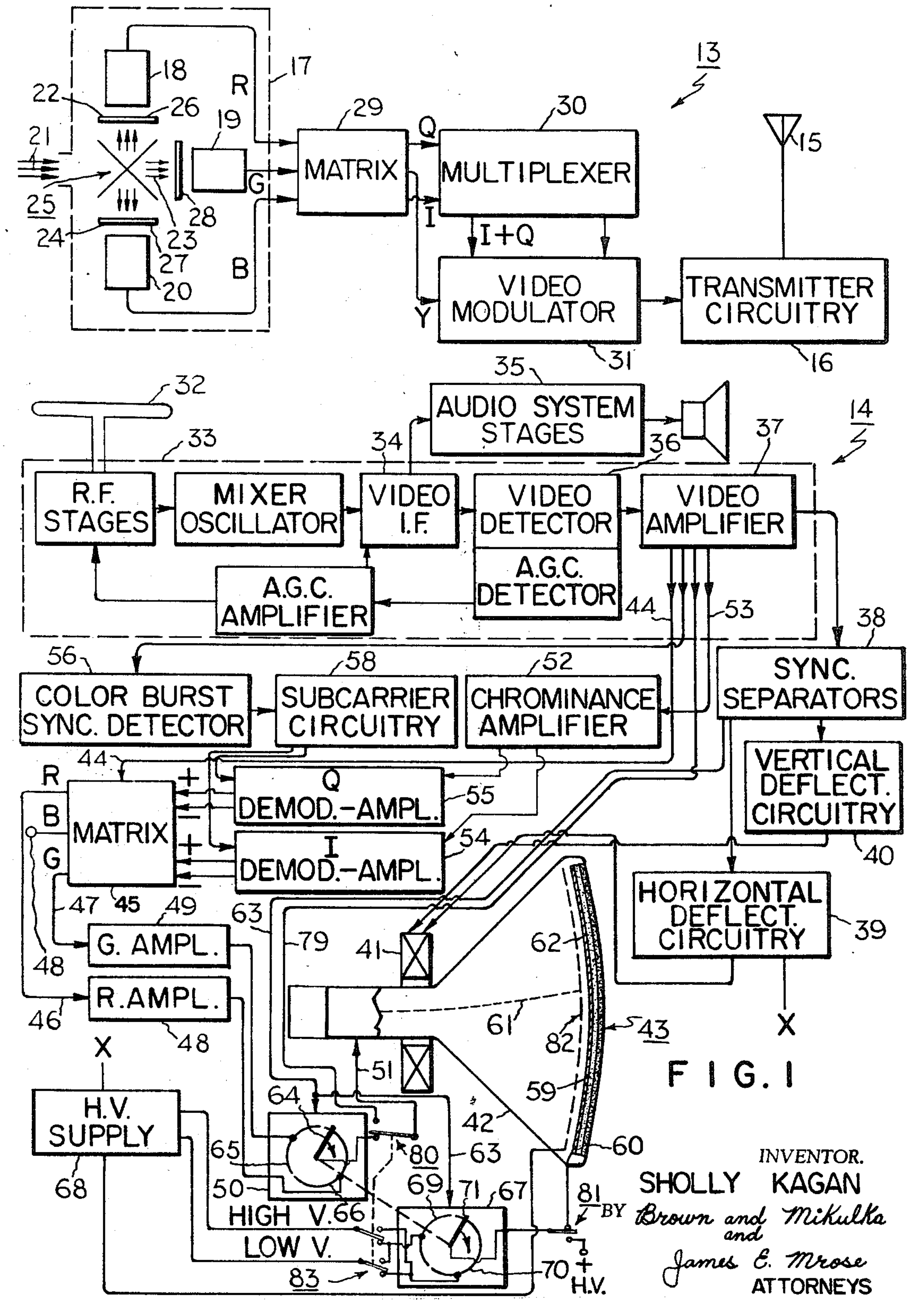

The present invention relates to improvements in excitations of velocity-modulated color television receivers, and, in one particular aspect, to novel and improved two-color line-sequential color television apparatus wherein nonsymmetrical high-voltage and gating pulses are uniquely and advantageously developed by uncomplicated and reliable solid-state equipment slaved to horizontal synchronizing signals.

In conformity with classical theories relating to color and its perception, reproductions of subjects in color have been approached routinely by resolving discrete incremental areas of the broad-area subject in terms of three primary-color components and by attempting to duplicate, as closely as possible, each of these discrete incremental areas with the same primary colors in the same proportions. Conventional three-color television systems provide a typical example of this straightforward point-by-point approach; there, each element of a scene is separately viewed by three cameras each responding to a different one of its three (red, green and blue) primary-color contents, and, at a receiving site, electrical signals characterizing the camera detections for each point in the scene are translated into excitations of one or more of three phosphors (respectively emitting red, green and blue light) which serve a corresponding elemental area of the picture tube screen. Typically, viewing-screen phosphors comprise minute dots arrayed in triangular clusters of three, and electron beams from three guns slaved with different ones of the three cameras are guided through a high-precision apertured shadow mask to impinge upon the different phosphor dots and thereby cause each emission of a different-color light from each of them to be in as direct a relation as possible to the amount of that same color which is present at a corresponding point in the televised scene. The inevitable search for greater economy, lesser criticality, increased brightness, and better quality has led to a number of alternative proposals which, in particular, would obviate the need for these highly complex mask and dot-cluster features. By way of example, multistripe and multiple-layer picture tube screens have been thought to be promising alternatives, with the latter holding the great attraction that each of the three light-emitting materials needed to produce a different one of the primary colors may be introduced as a separate and substantially continuous broad-area layer of film near the face of a picture tube. Through proper selection of screen materials and control of electron-accelerating potentials each of the layers may theoretically be excited into emission of a different primary-color light output which should serve to recreate the televised scene in full natural colors. As a practical matter, it is difficult to realize and maintain accurate color matching because colors from the three layers must be generated and viewed in just the right proportions or ratios so that they will combine in each elemental area to reproduce the same resulting color as that at a related point in the televised scene. Moreover, the high-frequency modulations of accelerating potentials which are required to effect color changes at rapid rates in such layered picture tubes tend to produce serious radiation problems.

It has also been known heretofore that certain advantages may be realized through exploitation of the phenomenon that colors perceived in the field of an image are evidently dependent upon the interplay of its longer and shorter wavelengths, without narrow limitation to those specific wavelengths of the Newtonian spectrum with which colors are classically identified. Recognitions based upon this phenomenon have permitted televising in multiple colors through translations involving less than the usual three color codes, and, specifically, by way of picture tubes which emit visible light of but two distinctive bands of wavelengths. In one convenient practice, for example, the screen of a picture tube may involve but two phosphors capable of emitting light of essentially reddish and greenish wavelengths, respectively, and which may be scanned by electrons such that they are either exci ed into emissions separately, or, alternatively, one and both are excited into emissions separately, in response to control signals characterizing the respective lightness-distributions in a televised scene being viewed through two different filters. Currently-preferred fabrications involve either the use of two phosphors which may be deposited in coextensive layers to form the screen, or, alternatively, a substantially homogeneous screen comprised of discrete juxtaposed amounts of the two phosphors (example: grains of one phosphor each carrying a coating by the other). Modulation of the kinetic energies of the impinging electrons (via control of accelerating potentials) provides an advantageous approach to modulation of the light emissions from the two phosphors when they either inherently emit or are artificially caused to emit differently under different accelerating-potential conditions. However, the levels and spacing between levels of needed accelerating potentials, and the electrical power involved, militate against color modulations on a high-frequency (typically 3.58 megacycles) dot-sequential basis; radiation problems alone necessitate the use of troublesome and costly shielding, for example. Line- or field-sequential modulations, at significantly reduced rates, would appear to be more attractive for that reason, and for the further reason that they better lend themselves to tape recording, except that routine application of existing concepts renders the color receiver susceptible to certain highly objectionable visual effects. Specifically, field-sequential scanning to produce different colors in the alternate fields tends to develop disturbing flicker. And, in line-sequential scanning, the vertical color resolution tends to be relatively coarse, with consequent prominent horizontal bands or lines being discernible, and, moreover, the displays tend to exhibit annoying line-crawl or "waterfall" effects. Important improvements in the production of displays involving essentially two color emissions may be realized through uniquely-programmed scanning on a special line-sequential basis wherein the color emissions are caused to be the same during two successive line scans and different during the third, for each of the interlaced fields in each frame. The resulting frames then advantageously define the desired multicolor impressions in terms of repeated close patterns of three successive horizontal lines, two of which have the same wavelengths of emissions and the third of which involves different wavelengths. These groups of theree adjacent lines serve to define the color as perceived by the viewer, and the color resolution is superior to that which would exist were the expected minimum groupings of four lines involved instead. In the improved ternary system, the odd number of lines, divisible by three, constituting the total linework of a full picture (commonly 525 lines), advantageously lend themselves to cyclic repetition of the same color coding, without alteration of the sequencing.

The aforesaid ternary system requires certain synchronized switchings which will insure that the color-characterizing signals are applied to a picture tube at the proper times, and that the modulations producing the different color emissions from the picture tube are also effected at such times. Preferably, the latter modulations involve changes in potentials applied to accelerating anodes; these potentials are at high voltage levels and of relatively high voltage spans which render the changes difficult to execute, particularly in the exceedingly short intervals available. The lack of symmetry which attends the switchings required in the ternary system poses a very severe problem when it is sought to perform such switchings by automatic electronic equipment which must be synchronized with the unusual picture-tube line scannings. In accordance with the present teachings, however, desired high-speed high-efficiency nonsymmetrical electrical signals for voltage charging and/or color gating may be advantageously produced by unique electronic circuitry in which interrupted resonance conditions and shock excitations are developed under precise control by television synchronizing pulses, and which lends itself to expression in static solid-state form.

It is one of the objects of this invention, therefore, to improve the production and sequencing of color-controlling signals in line-sequential color television apparatus.

Another object is to provide novel and improved ternary line-sequential color television apparatus in which electronic circuitry of uncomplicated low-cost construction and high efficiency uniquely generals high-voltage pulses for excitation of acceleration-anode structure of a penetration-type picture tube.

A further object is to provide advantageous television receiver apparatus in which two differently-emitting phosphors are distinctively stimulated into emissions by electrons which have their accelerating potentials modulated by nonsymmetrical high-voltage pulses generated in solid-state electronic circuitry synchronized with a ternary coding sequence wherein the accelerating potential is cyclically maintained at one level during a period equal to that of two successive line scans and at a different level during a period equal to that of a third line scan.

Still further, it is an object to provide novel and improved solid-state electronic pulse-generating networks in which nonsymmetrical high-voltage pulses are produced through interrupted resonance phenomena under control of unique combinations of synchronizing pulses.

By way of a summary account of practice of this invention in one of its aspects, the scenes viewed by camera equipment of a television transmitting station are translated into at least two separate lightness-distribution images by way of different optical filters, such as red and green filters, and each of these images is in turn processed by a different image orthicon tube to produce different characterizing electrical signals. At a receiving site, these electrical signals are duplicated for purposes of controlling an electron beam which scans a picture-tube screen target assembly including an inner layer of red-emitting phosphor superimposed coextensively upon an outer faceplate-supported layer of green-emitting phosphor. Modulation of the colors of emissions from the target requires that electron-accelerating potentials of two different levels be applied to an accelerating anode element of the picture tube from a source which will deliver, cyclically, first a relatively low potential during times when two successive lines are being scanned and then a relatively high potential when the third successive line is being scanned. The relatively low potential must be at predetermined level sufficient to excite the inner layer into emissions of reddish light, while leaving the outer layer substantially unexcited, and the relatively high potential must be at a significantly higher predetermined level sufficient to excite both layers into visible emissions simultaneously, thereby yielding a resulting substantially whitish or achromatic light output. Synchronously, the scanning electron beam intensity must be controlled in accordance with lightness-distribution information in the televised scene as viewed through the red filter while the relative low accelerating potential persists, and in accordance with lightness-distribution information in the televised scene as viewed though the green filter while the relatively high accelerating potential persists. The resulting perceptions or multiple colors in the reproduced scene are established by relatively fine interlaced groupings of but three lines (traced in red, red and white light outputs), with the resultant color resolution being of relatively high quality. Inasmuch as the accelerating potentials are at high voltage levels, and must be charged with great rapidity, conventional switching concepts are discarded and, instead, the desired pulses are produced by resonant LC circuitry involving picture-tube capacitance and a transformer unit which has an effective secondary inductance which may be altered quickly by short pulses of current forced through primary windings. These same current pulses are of low enough level to be controlled by inexpensive transistors, and yet are effective to induce secondary voltage of high enough value to develop desired positive and negative excursions of output voltage superimposed upon a reference DC high voltage. The desired unusual nonsymmetry of output signals for application in the aforesaid ternary line-sequential television system is promoted by unique divide-by-three circuitry which is synchronized with and triggers the current-pulsing transistors in coordination with pulses characterizing the horizontal line scanning.

Figure 2:
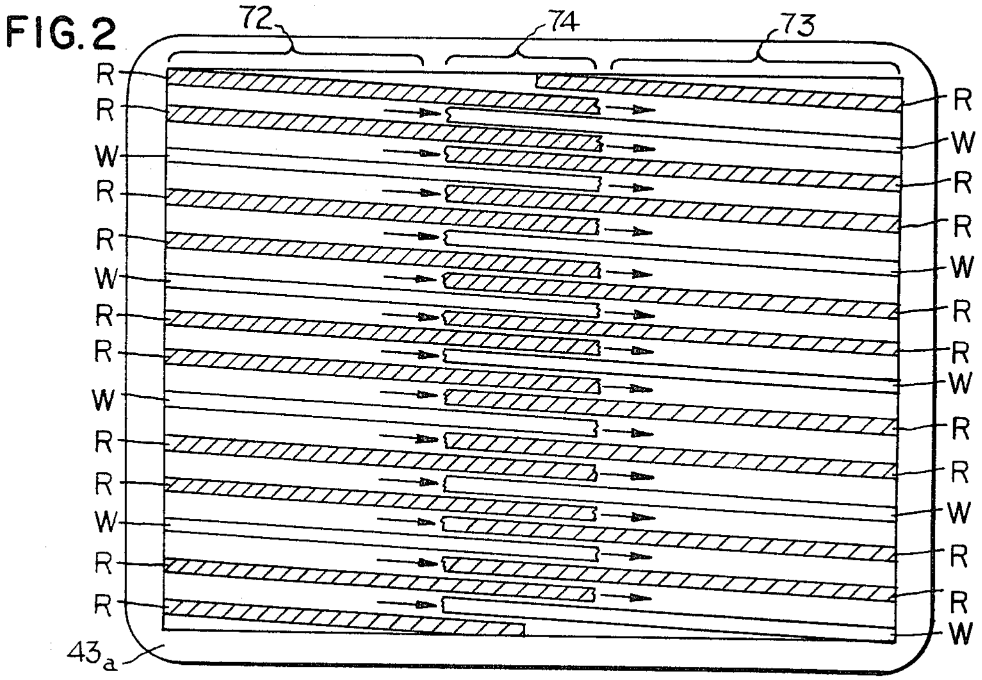
Figures 3, 4, 5:
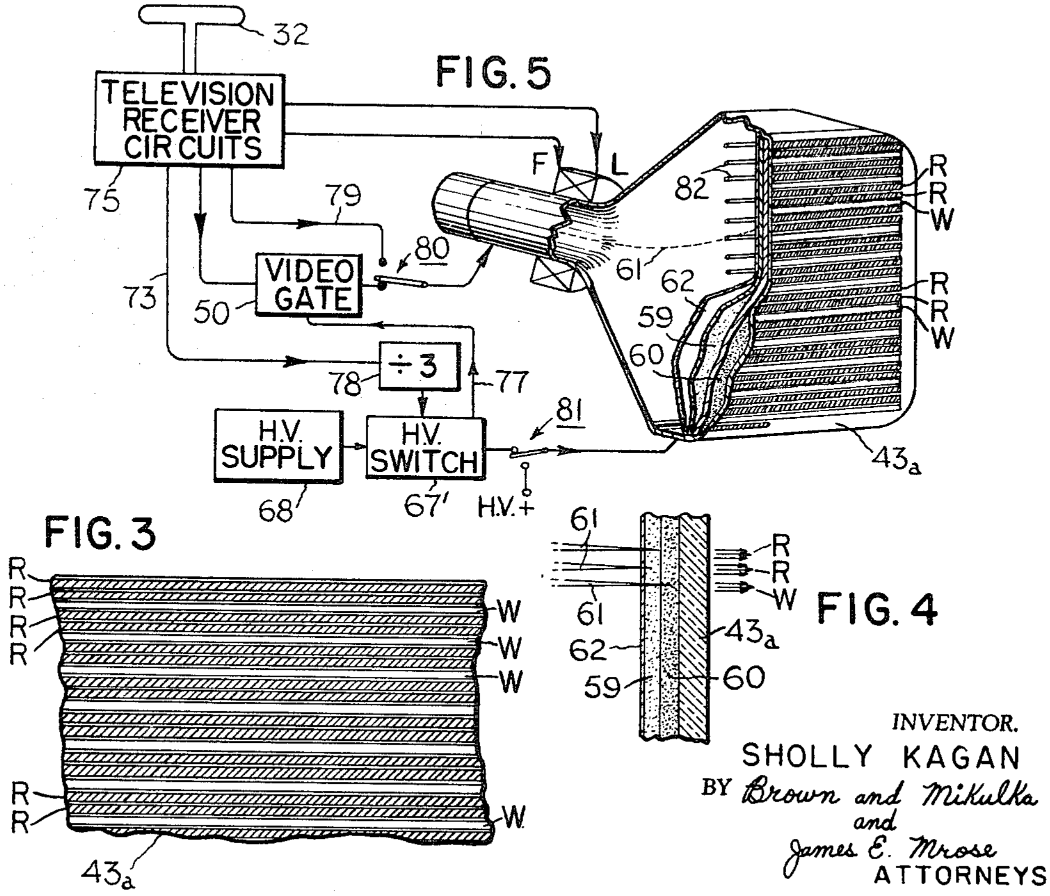
Figures 6, 12:
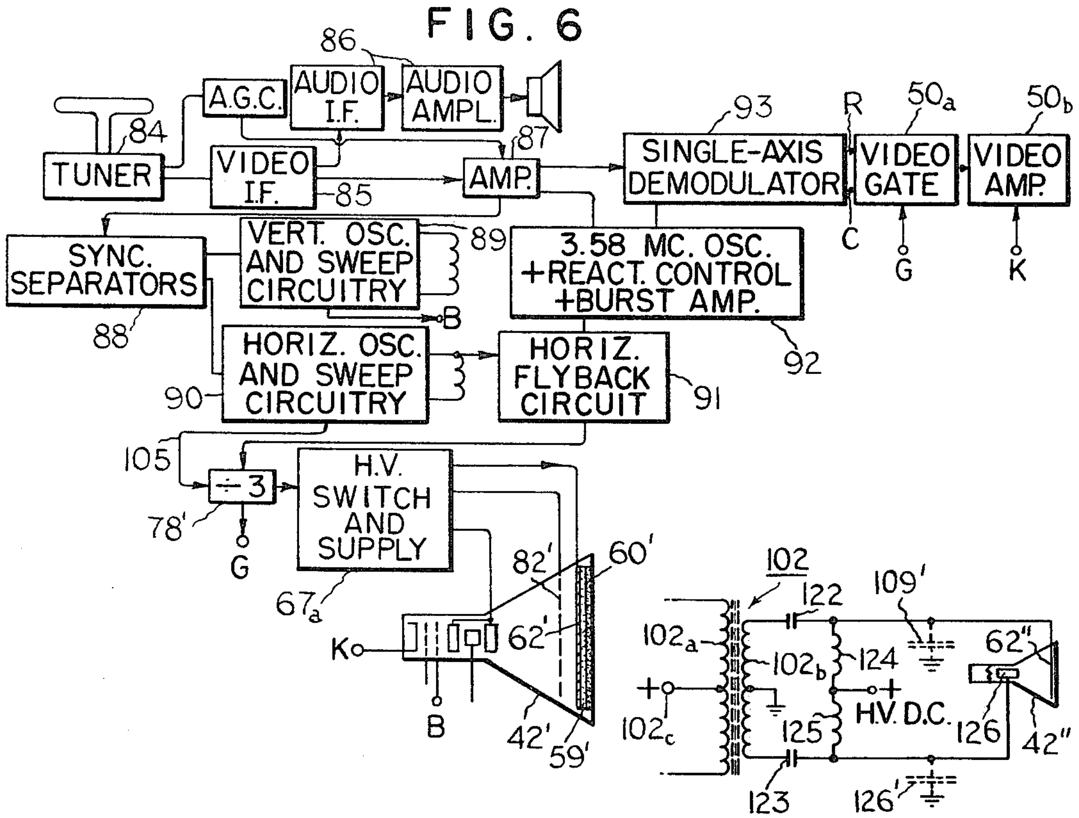
Figure 7:
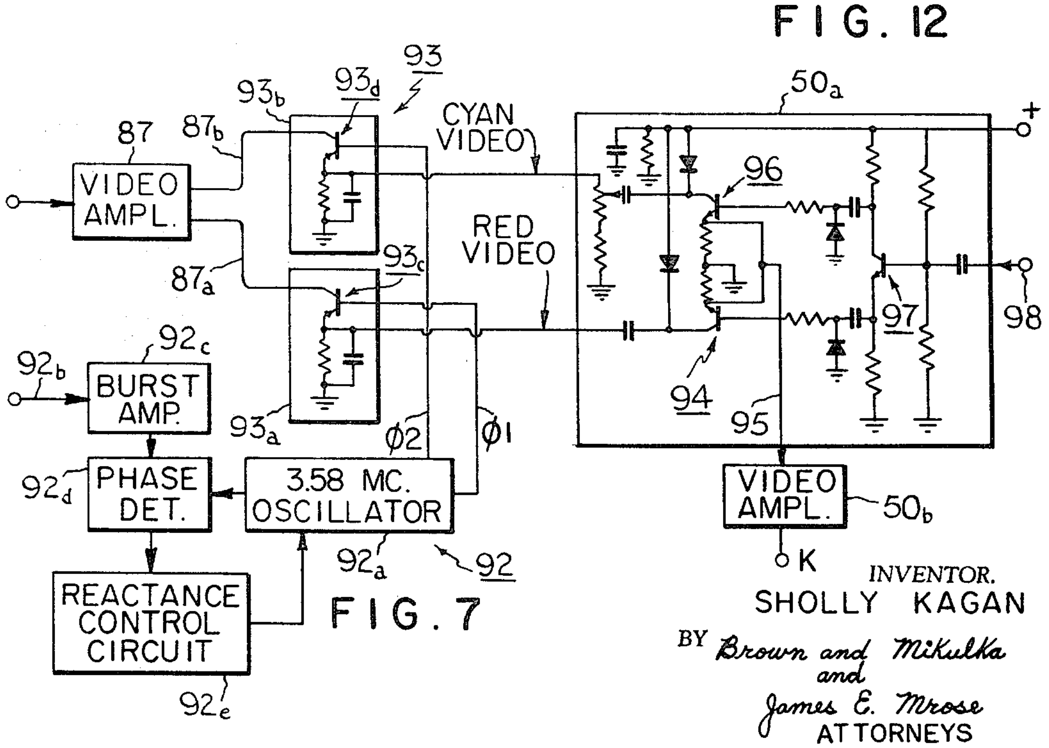
Figures 8, 9, 10, 11:
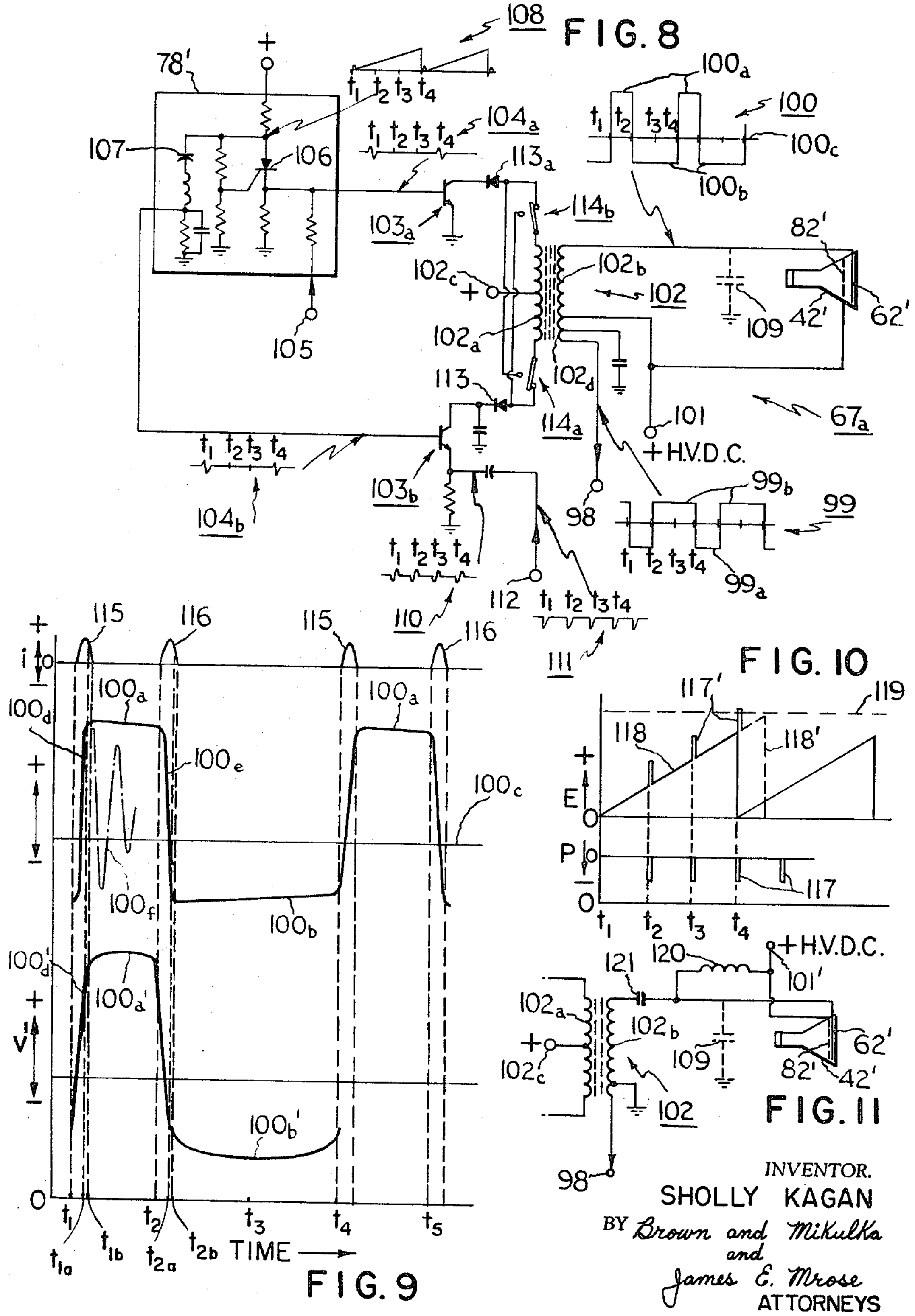

Although the features of this invention which are considered to be novel are expressed in the appended claims, further details as to preferred practices of the invention, as well as the further objects and advantages thereof, may be most readily comprehended through reference to the following description taken in connection with the accompanying drawings, wherein:

FIGURE 1 represents an improved color television system of the type in which the present teachings may be applied to particular advantage, the illustrations being in part in block-diagram and in part in schematic forms;

FIGURE 2 portrays in gross and exaggerated forms a ternary line-sequential scanning at the face of a binary color-coded picture tube such as that involved in the FIGURE 1 system, the scans being interrupted to distinguish those of alternate interlaced fields;

FIGURE 3 illustrates a fragment of a picture tube face evidencing the same ternary line-sequential scanning on a finer scale;

FIGURE 4 provides a transverse cross-section of a fragment of a layered picture tube target and face, together with symbolic representations of electron beam penetrations and resulting light emissions;

FIGURE 5 is a partly schematic and partly block-diagrammed representation of a television receiver which aids in an understanding of the present teachings, including a perspective view of a picture tube with portions broken away to expose constructional details;

FIGURE 6 provides a further color television receiver diagram, in block and schematic conventions, which is a further aid to understanding of improved circuitry specially suited to excitations of a binary color-coded picture tube for ternary line-sequential scanning;

FIGURE 7 provides schematic details of single-axis demodulator and video gating circuitry useful in the receiver system of FIGURE 6;

FIGURE 8 provides schematic details, together with related waveforms, for a preferred embodiment of the improved high-voltage and gating switch circuitry useful in the receiver system of FIGURE 6;

FIGURE 9 comprises a set of waveforms characterizing certain current and voltage conditions associated with the transformer operations in the FIGURE 8 switch circuitry;

FIGURE 10 comprises a set of waveforms associated with a divide-by-three circuit in the improved electronic apparatus of FIGURE 8;

FIGURE 11 illustrates an alternative high-voltage supply arrangement for a portion of the FIGURE 8 apparatus; and FIGURE 12 represents a further alternative high-voltage supply arrangement for a portion of the apparatus of FIGURE 8.

The system arrangement portrayed in FIGURE 1 includes color television transmitting and receiving apparatus, 13 and 14, respectively, which are in generally conventional communication by way of electromagnetic radiations within a prescribed television-frequency channel. Transmitting antenna 15 is excited by transmitter circuitry 16 of known form adapted to deliver an output modulated to contain the customary five components (audio, video, deflection, chrominance and color burst) for the color signals which are to be radiated. Luminance and chrominance aspects of televised scenes are characterized via a camera assembly 17 which includes the usual three image orthicon or equivalent pickup tubes 18–20 electrically excited in the customary fashion. Light 21 emanating from a televised scene is shown to be optically resolved into three image beams 22–24 by a mirror array 25, and, thereafter, each beam is passed through a different one of three color filters 26–28, respectively, before being permitted to impinge upon the sensitive surfaces of its associated pickup tube. One of these filters, 26, passes essentially one color component in the scene, such as its red content falling within the reddish (relatively long) wavelengths of light in the Newtonian spectrum; another filter, 27, passes another color component corresponding to distinguishably different wavelengths, such as the bluish (relatively short) wavelengths; and the third filter, 28, passes a further color component corresponding to the intermediate wavelengths, such as those associated with the color green. It will be recognized that these techniques include those commonly practiced in the generation and transmission of the now-conventional NTSC three-color television signals, and this is a distinct advantage from the standpoint of compatibility, although exploitation of the present teachings is not necessarily restricted to televising which involves the conventional red, green and blue filters, or of as many as three filters. Instead, desired effects may be realized when two filters view the scene with wavelengths which are distinguishably different, even though overlapping somewhat. For present purposes, it is important that the resulting color-separation images, which are characterized in terms of different electrical output signals from the camera tubes, are images which exhibit different lightness scales for the same scene. Such different lightness scales are of the type observed when different narrow-band filters are successively held to the eye in viewing a colorful scene. The three conventional-type cameras chosen for illustration produce electrical outputs which are processed by a conventional matrix 29 to produce the standard brightness (I) and chrominance (Q and Y) signals, which are then prepared for transmission by way of a known form of multiplexer 30 and modulator 31.

Within the receiver 14, the high-frequency radiations intercepted by antenna 32 are applied to a conventional embodiment of receiver circuitry 33, and are there resolved into component signals by equipment of types and forms well known in commercial three-color television receivers. Take-off from the video IF stage 34 delivers sound IF to the audio system stages 35 for example, and the video demodulation products from detector 36 are supplied to an amplifier 37. The latter delivers synchronizing signals to sync separators 38 serving the usual horizontal deflection circuitry, 39, and vertical deflection circuitry, 40, which supply the horizontal and vertical deflection coils of the deflection yoke 41 associated with the picture tube 12 having a layered faceplate structure 43. In addition, a coupling 44 applies to a matrix 45 a composite luminance signal (Y) which corresponds to the summation of the brightness of the color signals derived from all three camera tubes; this matrix of course converts applied signals into the usual three electrical output signals corresponding, in channels 46–48, to the red, green and blue color-separation signals developed at the transmitter by the camera tubes 18–20, respectively. Only the output signals in channels 46 (red) and 47 (green) need be used in the illustrated system, however, and amplifiers 48 and 49 prepare these two matrix output signals for application to a gating or switching unit 50, which in turn applies appropriate modulating signals to a control electrode of picture tube 42 via coupling 51. Although they are conventional, it is perhaps helpful at this juncture to refer briefly to the other chrominance circuits which cooperate by supplying information to matrix 45 for the decoding operations. In this connection, it is to be noted that video amplifier 37 applies a chrominance (video modulation) signal to a chrominance amplifier 52 by way of a coupling 53, and that I and Q signal sideband components in quadrature are thence delivered to the I demodulator-amplifier 54 and Q demodulator-amplifier 55 which ultimately supply I- and Q-related output signals to the matrix. For the latter purposes, color burst signals associated with transmitted horizontal blanking pulses are applied to a color burst sync detector 56 from the video amplifier circuitry 37 and control the phase of the local subcarrier oscillator signal developed within the subcarrier circuitry (oscillator-amplifier) 58. An in-phase output from that circuitry is delivered to the I demodulator-amplifier 54, and a 90-degree out-of-phase output is delivered to the Q demodulator-amplifier 55; video I and Q signals are selectively developed as the result of I and Q sideband combinations with the subcarrier outputs with which they are in phase.

The system as thus far described produces two electrical control signals, in the picture tube grid excitation coupling 51, which are closely related to the three lightness-distribution images of the televised scene as viewed through two (red and green) of the camera filters. In causing the picture tube 42 to generate a display of the same scene in substantially full color, the system under discussion very advantageously obviates the need for attempting to reproduce the three images in terms of precisely the same colors in which they were viewed. Instead, the lightness distributions in one of the two images, specifically that viewed through green filter 28, are merely characterized in terms of substantially white light at the face of the picture tube, and the lightness distributions in another of the images, specifically that viewed through red filter 26, is characterized in terms of colored light of wavelengths which appear to be substantially reddish. Important practical implications of this practice are evidenced by the picture-tube target assembly 43, which is comprised of essentially two layers 59 and 60 of light emitting materials. These layers are coextensive with and preferably supported upon the interior of the glass faceplate of the evacuated tube envelope. Innermost layer 59, nearest the electron gun, may comprise a conventional phosphor which emits substantially red visible light in an optimum manner when struck by electrons from beam 61 having a relatively low kinetic energy (i.e. relatively low velocity), as determined by relatively low accelerating potentials applied to the inner conductive (ex. evaporated aluminum) layer 62 which is of a type and form commonly used in picture tube constructions and serves as an accelerating anode. Outer layer 60, nearest the faceplate, efficiently emits light of another predetermined color, such as substantially green or cyan light, when excited by impinging electrons having a relatively high kinetic energy as determined by relatively high accelerating potentials applied to the anode 62. Emissions of reddish light from inner layer 59 occurring simultaneously with emissions of greenish or cyanish light from outer layer 60, during intervals when the higher accelerating potentials are applied, result in substantially whitish light outputs. Consequently, the picture tube is effectively a binary color-coded device, producing substantially red and white outputs; however, the viewers' mind-eye relationships enable their perceptions of multi-color images substantially like those of the televised scene when the picture tube is properly modulated.

As has already been noted hereinabove, gate 50 serves to switch the applied red and green lightness-distribution signals to a control electrode of the picture tube 42, under control of synchronizing signals applied thereto via coupling 63 from the sync separator circuitry 38. In the schematic illustration of gate 50, a switching armature 64 rotated clockwise at the rate of one revolution during each three successive horizontal line scans wipes arcuate contact segments 65 and 66 which occupy substantially one-third and two-thirds, respectively, of the circular contacting span, such that the green-related signals are coupled to the control electrode during one line scan and the red-related signals are coupled to the control electrode during the other two line scans. Electron beam 61 is thus suitably modulated in intensity to characterize the red and green lightness-distribution information in terms of red and white light outputs, respectively, from the screen phosphor layers 59 and 60, provided the accelerating potentials are appropriately varied in synchronism. In the latter connection, the needed relatively high and low accelerating potentials at the anode 62 are produced synchronously by a switch or gate 67 which is generally like gate 50 and is similarly synchronized by signals from coupling 63. High voltage supply 68 normally delivers the high and low accelerating voltages to contact segments 69 and 70, which are wiped by armature 71 and which are of arcuate spans corresponding to those of segments 65 and 66, respectively. Although the commutating by gates 50 and 67 is illustrated schematically, the gating is advantageously achieved electronically in accordance with the present teachings by way of circuitry such as is discussed later herein.

In FIGURE 2, the front face 43*a* of a picture tube such as that of the FIGURE 1 receiver 14 is depicted with the ternary line-sequential line traces exaggerated in thickness and illustrated on a coarse scale (a total of 27 lines vs. 525 lines making up a full raster in actual practice), as an aid to clarity. Lines of the first field, portions of which are embraced by bracketing 72, are traced from left to right in the sequence red-red-white (R-R-W) from top to bottom, ending with half of the mid line (the 14th vs. the 263rd line of the usual 525-line raster). Lines of the second field, portions of which are embraced by bracketing 73, begin with the other half of the mid line and continue in the same sequence (R-R-W) without interruption until the second field is fully interlaced with the first to make up a full frame. Importantly the interlaced lines (the red lines being cross-hatched for distinctiveness in the illustration) are in the same R-R-W sequence, from top to bottom, as shown by the interlaced portions embraced by bracketing 74. Because each field includes an integral multiple of three lines, plus 1½ additional lines, the total odd number of lines in the frame being an integral multiple of three, the described ternary groupings (R-R-W) of lines will fit the frame and will not require changes in the color sequencing or acceleration-voltage sequencing to preserve a stable R-R-W sequencing in the interlaced fields. A fragment of the same faceplate is shown in somewhat finer line detail in FIGURE 3, from which it will be evident that the ternary groupings of two red and one white line can, on a yet finer scale (example: 525 lines to a full frame), produce a relatively homogeneous appearance at normal viewing distances. Of course, the observer is not conscious of the separate white and paired red lines but, instead, perceives substantially full-color images across the full raster area in accordance with principles referred to earlier herein. A mere alternation of red and white lines scans, in accordance with an orthodox approach to scanning, would inevitably result in interlaced linework of a less desirable R-R-W-W sequencing, and, although such reproductions would also be sensed in multiple colors, the four (two pairs of) lines required to develop color impressions would produce a relatively coarse vertical resolution and tend to introduce undesirable relatively coarse horizontal linework into the color images. By way of distinction, the narrower ternary groupings of lines promote a significantly finer and advantageously higher-quality color resolution. While a relatively low accelerating potential is being impressed upon anode 62, the innermore phosphor layer 59 is excited by electrons from beam 61, thereby emitting reddish light, and the outermore layer 60 remains substantially quiescent and unexcited, as shown by the two upper line-trace impingement conditions in FIGURE 4. The third (lowermost) trace in the ternary sequencing involves penetration of the beam through the inner layer and into the outer layer 60, such that greenish or cyanish emissions from the latter layer combine with the reddish emissions from the inner layer to produce resultant whitish emissions. Although the target layers are depicted as directly superimposed, known optically translucent barrier or retardation layers (such as those of zinc sulfide) may be used between the emissive layers to aid in establishing an optimum accelerating-voltage threshold for the emissions of light by the two layers. The phosphor layers may also be of different thicknesses and may yield outputs of different brightnesses. Because there are twice as many red as white lines in the frames, the red-emitting phosphor may be permitted to exhibit lower brightness characteristics. Selection and application of the phosphors may be in accordance with established prior techniques and teachings in the art, and it should be understood that, although reddish- and cyanish-emitting phosphors are curently preferred, these may be replaced by others having different color-emission characteristics and yet producing the desired multi-color impressions in accordance with the principles referred to hereinabove. Accordingly, the designations "R" and "W" in the sequencings discussed herein should also be understood to embrace colors which are not necessarily limited to red and white, respectively. However, it is preferred that substantially whitish light be observable from the phosphor excitations, inasmuch as this provides the basis for compatibility with black-and-white, as well as color, reproductions. In the latter connection, it is an advantage that by merely holding the anode 62 at the higher potential, continuously, while applying the usual black-and-white video signals in coupling 79 (FIGURES 1 and 2) to the picture-tube control electrode, black-and-white reproductions are obtained on the same screen target. Switch 80 serves to make the connections from color or monochrome video channels to the picture tube, and, although conveniently illustrated as a manually-operated switch, may be replaced by an automatic equivalent such as a simple electromagnetic relay switch responding to electrical signals, from a conventional color-killer circuit, characterizing the presence or absence of color-burst signals in the received television signals. A fixed high accelerating voltage is likewise applied to anode 62 at such times, via switch 81 (FIGURES 1 and 5), whereby the electron beam impinges upon and excites both phosphor layers to develop whitish light outputs. This may be of the same automated type, also. An inner conductive screen or mesh 82, close to the target layers and maintained at a fixed accelerating potential, is useful in preserving essentially fixed accelerating conditions for the electron beam while undergoing deflections; misregistration of the images is thereby reduced, and the potential modulations on the more removed anode 62 then serve to alter the electron kinetic energies for purposes of exciting one or both of the phosphor layers. Other misregistration-compensation techniques may be practiced, instead.

It has been found that in the preferred red-red-white ternary line-sequencing receiver, operations in the black-and-white mode can produce overly cool tones as the result of dominating coolness of the emissions from the greenish outer layer. Uniquely, this effect may be offset or compensated by a reversal of the sequencing which occurs during color reproductions, such that the monochrome-mode reproductions are then also on a ternary line-sequential basis, coded white-white-red. For this purpose, the accelerating-voltage switch 65 (FIGURE 1) merely has its inputs to the commutator segments reversed, by a reversing switch 83, whereby the higher accelerating voltages persist during two line scans and the lower accelerating voltage merely during the third. At such times, the monochrome video is coupled to the control electrode structure via switch 80. The resulting monochrome images include fine red lines (every third line) which are not disturbing at normal viewing distances and which, instead, pleasingly warm the resultant picture tones. These effects are advantageously realized through reversals of the accelerating-voltage switching code in the electronic switching equipment.

The television receiver apparatus represented in FIGURE 5 corresponds functionally to that illustrated in connection with the system of FIGURE 1, and functional counterparts are thus identified by the same reference characters for the purpose of simplifying these disclosures. Block-diagrammed circuitry 75 embraces those networks other than the color- and voltage-gating components. As has been explained with reference to FIGURE 1, video gate 50 switches to the picture-tube control electrode structure the electrical signals related to the red and green lightness-distribution characteristics in the televised scene, the switching being at rates and in a predetermined synchronism which causes the traced lines to appear in the illustrated ternary-grouped R-R-W sequence. In accordance with certain aspects of the present teachings, switch 50 is an electronic gate uniquely triggered to shift its couplings of the applied red and green signals to the picture tube in accordance with the desired sequencing under control of gating pulses generated in the high-voltage switching network 67′ and applied thereto over coupling 76. Network 67′ is also an electronic switch, operating uniquely to develop the needed high and low accelerating potentials synchronously from a D.-C. supply in response to control signals derived from horizontal sync pulses appearing in coupling 77 and processed by a divide-by-three electronic circuit 78. Detailed disclosures of the embodiments of these electronic components are reported hereinbelow and, for the moment, are deferred while the general features of an associated receiver are being considered.

The color television receiver system portrayed in FIGURE 6 includes front-end circuitry which is of conventional form, including the usual tuner 84, video IF stages 85, audio stages 86, video amplifier 87, sync separators 88, vertical oscillator and sweep circuitry 89, horizontal oscillator and sweep circuitry 90, horizontal fly back circuitry 91, and circuitry 92 which includes a 3.58 mc. oscillator, a reactance control and burst amplifier. However, the picture tube 42′, which is like the tube 42 referred to earlier herein and includes two phosphor layers 59′ and 60′ backed by an anode 62′ and a registration mesh 82′, is excited in the aforementioned ternary line-sequential mode via other uncomplicated electronic networks including a simple single-axis demodulator 93, video gate 58a and video amplifier 50b divide-by-three unit 78′, and the high-voltage switch and supply 67a. Inasmuch as only two color codings are required, the composite video signals applied to demodulator 93 from video amplifier 87 may be conveniently resolved into red-characterizing (R) and cyan-characterizing (C) electrical output signals by passing through separate gating channels those portions of the 3.58 mc. composite video which are of phases characterizing the red and cyan color content, respectively. As is shown in FIGURE 7, such demodulation may be performed with the aid of two simple units 93a and 93b, each of which includes a different one of the transistors 93c and 93d, respectively, having its base excited by a different one of the oppositely-phased 3.58 (approx.) mc. outputs $\phi_1$ and $\phi_2$, respectively, from the 3.58 mc. oscillator 92a. The output signals $\phi_1$ and $\phi_2$ are substantially 180 degrees out of phase in relation to one another and, further, are synchronized in relation to the usual color burst signals such that they periodically render the transistors 93a and 93b conductive of the applied color-characterizing video signals only at such times as the latter 3.58 (approx.) mc. signals characterize the red and cyan conditions, respectively. This takes advantage of known attributes of the 3.58 mc. color-characterizing video signals, appearing in couplings 87a asd 87b. For purposes of synchronizing the oscillator 92a with the color burst signals appearing in input coupling 92b, the phases of signals from the oscillator and from the burst amplifier 92c are compared by phase detector 92d, the outputs of the latter being used to regulate a reactance control circuit 92e which slaves the oscillator 92a. Such oscillator-synchronizing networks are of course well known in current color television systems, where they are used to provide signals for Q and I demodulator stages. Red- and cyan-characterizing output signals from units 93a and 93b are next gated to a conventional type of video amplifier 50b, and thence passed on to the cathode K of picture tube 42′ at proper times synchronized with the red and white line-scanning times. The synchronized gating of these output signals is performed in the gating network 50a which includes a transistor 94 which is biased at appropriate times to pass the red video signal to output coupling 95, and a transistor 96 which is at other appropriate times biased to pass the cyan video signal to the same output coupling. The needed biasing of gating transistors 94 and 96 are under control of a further transistor 97, which responds to an input of pulses applied to coupling 98 from the circuitry of FIGURE 8. These synchronized gating pulses are shown by waveform 99 in FIGURE 8, the shorter negative pulses 99a being effective to gate only cyan video signals to the picture tube control electrode structure, and the longer (substantially twice as long) positive pulses 99b being effective to gate only the red video signals to the picture tube via amplifier 50b.

The FIGURE 8 network comprises the divide-by-three circuit 78′ in cooperative relationship with a high-voltage circuit 67a which generates the desired accelerating-voltage waveform 100 for the picture-tube anode 62′. As shown, the anode voltage is at a relatively high level, characterized by pulses 100a, during certain periods (between about times $t_1$ and $t_2$, for example) which correspond to the times when the cyan-characterizing video signals are applied to the picture tube control electrode structure. This voltage is also at a relatively low level, characterized by pulses 100b, during periods (between about times $t_2$ and $t_4$) which correspond to the times when the red-characterizing video signals are applied to the picture tube. Pulses 100a and 100b are respectively positive and negative in relation to a D-C voltage level 100c which is substantially that applied to terminal 101 from a suitable source. These pulses are developed with the aid of the secondary 102b of a transformer-type inductance unit 102 which has a center-tapped primary 102a. A D-C supply connection at primary tap 102c provides pulse excitations of the transformer primary halves at times controlled by the associated transistors 103a and 103b. The bases of these transistors receive short pulse excitations at times $t_1$ and $t_4$, as determined by the circuit 78′, and as shown by waveforms 104a and 104b, respectively. These short pulses at times $t_1$ and $t_4$ are produced by circuit 78′ in response to horizontal sync pulses applied to that circuit over coupling 105 (FIGURES 6 and 8) at each of the times $t_1$ through $t_4$. In its illustrated form, circuit 78′ is a relaxation oscillator involving a silicon controlled switch 106 and a capacitor 107 which is charged and discharged under control of the SCS 106. Horizontal synchronizing pulses applied to the SCS cathode via the aforesaid coupling 105 cause breakdown of the switch 106 and attendant sudden discharges of the capacitor for every third periodic pulse in a horizontal sync pulse train taken from a site such as the horizontal sweep circuitry 90 (FIGURE 6). Ordinarily, the times of capacitor discharges could be somewhat erratic without the slaving to the horizontal sync pulses; however, the latter negative pulses, which effectively add to the capacitor voltages at times such as $t_1$, $t_4$, etc., are of sufficient value to insure that breakdown will occur exactly when intended, but not otherwise. The charging and discharging waveform is designated by reference character 108 and appears at the illustrated circuit point associated with the SCS anode.

When a pulse from circuit 78′ is applied to upper transistor **103*a* at time $t_1$, it causes a correspondingly brief flow of current through the upper half of primary 102*a*. Importantly, during the interval of the current pulse, the primary is effectively coupled to a zero impedance source, and this characteristic is in turn witnessed by the secondary, which then exhibits a low inductance and results in a high resonant frequency condition being produced on the secondary side. This very brief resonant frequency condition involves the relatively small inductance (L) sensed at the secondary in combination with the capacitance (C), to ground, of the anode 62′, designated by dashed line work 109. Therefore, at time $t_1$ the secondary voltage rises very steeply, and, importantly, in a substantially sinusoidal manner, to the relatively high level 100*a*. By way of example, the D-C voltage level 100*c* may be about 15 kv., with the positive pulses 100*a* extending upwardly 4 kv. to 19 kv., and with the negative pulses 100*b* extending downwardly 2 kv. to 13 kv. The voltage excursions on the secondary side are governed by the turns ratio multiplied by the primary voltage, although the primary voltage obtained from a given D-C supply is greater than expected due to the Q of the circuitry. Hence, the D-C voltage at supply terminal 102*c* may be lower than that for a normal type of push-pull operation, and the resonance phenomena present in the system are thus employed to further advantage in that the input power requirements are reduced. At the same time that the transistor 103*a* conducts, the lower transistor 103*b* is prevented from conducting by one of the inhibit pulses 104*b* applied to its base. Once the high potential level 100*a* is reached at the anode 62′, it remains there until time $t_2$ because of the much lower resonant frequency condition which persists once the short current pulse applied through transistor 103*a* to the upper half of the primary has disappeared. That is, after the primary current ceases, and until time $t_2$, the LC combination is that for a much lower frequency, the effective inductance (L) on the secondary side being much higher than before. A slight decay in level of voltage 100*a* (not illustrated in FIGURE 8) can occur before time $t_2$ is reached, although the anode voltage remains substantially at the desired high level. At time $t_2$, transistor 103*b* is switched on by a pulse of the type shown in waveform 110 applied to its emitter and derived from the flyback pulses of waveform 111 appearing in coupling 112 from the horizontal flyback circuit 91 (FIGURE 6). Therefore, by actions similar to those described for the conditions at time $t_1$, the lower half of the primary 102*a* draws current at time $t_2$, in a direction opposite to that considered earlier, and induces secondary voltages swiftly dropping the output to the relatively low voltage level 100*b*. When the primary current pulse disappears, the higher inductance (L) effective in the secondary resonant circuit maintains the desired lower voltage (with a negligible rise not illustrated in FIGURE 8) for a double-length interval ($t_2$ to $t_4$). At times $t_3$, the flyback-related pulse applied to transistor 100*b* cannot change its state because the lower diode 113 is in a blocking state which keeps the associated transistor collector at a substantially zero level. Not until time $t_4$, when another pulse causes the upper transistor 103*a* to conduct, does the cycle repeat itself. As a result, the desired relatively high anode voltage 100*a* is produced during one line scan (time $t_1$ to $t_2$) when the whitish output from the target phosphors is to be created, and the desired relatively low anode voltage 100*b* is produced during the ensuing two line scans (time $t_2$ to $t_4$) when the reddish output is to be created by emissions from the inner phosphor layer alone. Gating pulses 99 of comparable synchronized periodicities, but reversed polarities, are conveniently taken from a portion 102*d* of the secondary winding. For the aforementioned alternative WWR mode of monochrome operation, the operating conditions in circuit 67*a* need only be reversed, as by reversing the settings of switch halves 114*a* and 114*b***, either manually, or automatically under control of the aforementioned circuitry based on known color-killer provisions.

Pulses 115 in FIGURE 9 characterize the very brief current-flow conditions in the upper half of transformer primary **102*a* when the transistor 103*a* is cyclically biased into conduction by pulses 104*a* substantially at times $t_1$, $t_4$, etc. Current pulses 116 occur through the lower half of the transformer primary 102*a* when the opposite transistor, 103*b*, is cyclically biased into conduction substantially at times $t_2$, $t_5$, etc., by the aforementioned combined control effects of pulses 104*b* and 110. Diodes 113 and 113*a* insure that currents will flow through the primary halves in the intended directions. The attendant high-voltage swings induced in the secondary 102*b* are of substantially sinusoidal form, as shown by the leading and trailing edges 100*d* and 100*e* of the high-voltage pulses (FIGURE 9). As has been explained hereinabove, the capacitance to ground, 109, of the picture tube 42′ and the inductance of transformer 102 with which it is combined, tend to have a relatively high resonant frequency during the cross-over conditions under discussion. During such cross-over periods, the transformer exhibits on its secondary side only a relatively small leakage inductance. Dashed linework 100*f* characterizes the damped sinusoidal output which would be expected to result. However, upon open-circuiting of the primary 102*a* following each application of a short current pulse thereto, the inductance effective on the secondary side is significantly increased, causing the effective resonant frequency to be much lower until a succeeding primary-current pulse occurs. Specifically, the latter inductance is made high enough such that significantly less than one-half cycle of voltage variation can occur either in the interval between such times as $t_1$–$t_2$ and $t_2$–$t_4$. Some voltage variation (decay, in the case of pulses 100*a*, and increase in the case of pulses 100*b*) can be expected to occur, and these are illustrated in FIGURE 9. Current pulses 115 and 116 are made less than the flyback times, such that the desired voltage levels 100*a* and 100*b*** will be sustained during the line-scan intervals. Design of the circuit parameters is in accordance with known principles, as dictated by the foregoing considerations within the purposes of the present invention. Additional capacitance may be combined with that of the picture tube, where desirable.

An important aspect of the mode of operation of transformer 102 lies in the fact that the voltage multiplications are greater than would result from conventional transformer winding ratio effects alone; this stems from the resonance with the picture tube capacitance, the LC circuitry being shock-excited by the transistor-controlled current pulses. Although it can reduce loss of power, and minimize heating in the control transistors, to have these transistors cut off when the shock-exciting primary current is at zero level, the secondary voltage waveform is significantly improved for present purposes when the transistors are cut off somewhat before the primary current pulses reach zero level under the then-existing resonant-circuit conditions. In the case of transistor 103*a*, the triggering pulses 104*a* is made shorter than the natural half-cycle period $t_1$–$t_{1b}$ of primary current pulse 115, such that cut-off occurs at time $t_{1a}$; the secondary voltage of wave-front 100*d'* (FIGURE 9) thus does not reach its peak when cut-off occurs, and, instead, continues its upward rise. Positive pulse 100*a'* then crests after times $t_{1a}$ and $t_{1b}$, at a time when the resonant frequency is lowered, such that it remains at a high level throughout the interval $t_{1b}$–$t_2$. Early cut-off is especially important in the case of transistor 103*b*, at times $t_{2a}$, rather than time $t_{2b}$, such that the longer negative pulse 100*b'* is susained at a substantially fixed level between times $t_{2b}$ and $t_4$.

Divide-by-three network 78' (FIGURE 8) comprises a self-running sawtooth oscillator whose output pulses (104*a* and 104*b*) must be well synchronized by the horizontal synchronizing pulses applied to its input coupling 105. The latter pulses 117 (FIGURE 10) are negative, for for purposes of synchronizing in the illustrated circuitry (FIGURE 8). Inasmuch as transistor 103*a* is not affected by these pulses, they are eliminated from waveform 104*a*. Being applied to the cathode of SCS 106, these negative pulses are effectively additive to the sawtooth wave 118 developed in network 78', insofar as breakdown or firing of hard conduction in the SCS is concerned. Accordingly, the pulses 117' are illustrated in superimposed relation to sawtooth 118 in FIGURE 10, and it is there evident that every third synchronizing pulse will bring the voltage across the SCS to the breakdown level 119. Synchronism with every third pulse must therefore occur, even though thet natural sawtooth-generating periodicity tends to be somewhat longer, as shown by dashed linework 118' in FIGURE 10.

For purposes of avoiding the need for transformer insulations capable of withstanding the maximum accelerating-anode potential (example: 18 kv.), an alternative circuit arrangement such as that of FIGURE 11 may be employed. There, the high-voltage D-C connection 101' is made to anode 62' through choke 120 while the pulsating outputs (example: ±3 kv.) from transformer secondary 102*b* are coupled to that anode through a blocking capacitor 121. Choke 120 isolates the pulse outputs from the D-C supply. The transformer insulation thus need insulate for only 3 kv. FIGURE 12 illustrates a similar alternative designed for use with a mesh-less picture tube 42''. Capacitors 122, 123 and chokes 124, 125 serve the functions noted in connection with FIGURE 11. The capacitance-to-ground 109' of target anode 62'' is about the same (within about 10%) as the capacitance-to-ground 126' of an inner anode 126, such that the resonance conditions involving both halves of the transformer secondary 102*b* are about the same also. In another construction, the FIGURE 12 arrangement may be modified, at cost of improved transformer insulation, by eliminating the chokes and capacitors and by applying the high-voltage D-C to the center tap of the transformer secondary. Where a picture-tube mesh is to have its voltage varied also, part of the transformer secondary may serve to provide the neded pulsated supply. There are numerous departures which may be made from the specific practices and constructions which have been thus far described, within the purview of the same teachings. Although embodying systems have been discussed in terms of red-and green-emitting phosphors, others may be chosen with useful results, such as orange- and cyan-emitting phosphors, or others which have the required relatively long and short visible wavelength characteristics known to produce multiple color impressions from a binary color-coded system in accordance with established principles. The characteristics of a 525-line system are not limiting ones, though currently preferred. Autotransformer units may replace the more conventional transformer devices of the illustrated embodiments, and the color-gating pulse outputs may be taken from wholly separate windings rather than tapped portions of the secondaries. Tubes or SCR's may replace the illustrated transistors controlling the exciting currents of the inductance units, and it will be evident to those skilled in the art that the divide-by-three circuiry may assume forms somewhat different from that presented by way of a preferred example. For some applications, the high-voltage swings may be essentially in one direction up or down from the level of the associated D-C source, or may have different excursions in the two directions. Accordingly, it should be understood that the embodiments and practices described and portrayed have been presented by way of disclosure, rather than limitation, and that various modifications, substitutions and combinations may be effected without departure from the spirit and scope of this invention in its broader aspects.

What I claim as new and desire to secure by Letters Patent of the United States is:

1. Television apparatus wherein scanning electrons in a picture tube are modulated, comprising resonant-circuit means selectably controllable to exhibit relatively high and relatively low resonant frequencies, driving means for intermittently shock-exciting said resonant circuit means in at least one electrical sense with impulses of electrical energy and simultaneously increasing the resonant frequency of said resonant-circuit means to the high resonant frequency, said driving means including means for intermittently changing the voltage in said resonant-circuit means while simultaneously increasing the resonant frequency thereof and in a predetermined nonsymmetrical alternation with said impulses wherein the durations of the increases in the resonant frequency are short in relation to both of different alternate spacings therebetween, and means applying electrical signals from said resonant-circuit means to the picture tube in control of modulation of scanning electrons therein.

2. Television apparatus wherein scanning electrons in a picture tube are modulated, comprising inductive means in resonant-circuit combination with capacitance, driving means for intermittently shock-exciting said resonant-circuit combination in at least one electrical sense with pulses of electrical energy and simultaneously increasing the natural resonant frequency of said combination, said driving means including means for intermittently changing the voltage in said combination while simultaneously increasing the resonant frequency thereof and in a predetermined nonsymmetrical alternation with said pulses wherein the durations of the increases in the resonant frequency are short in relation to the spacings therebetween, means exciting said driving means to shock-excite said combination in a predetermined non-symmetrical alternation with the intermittent changes in said voltage to produce different alternate spacings between said pulses and said intermittent changes in said voltage, and means applying electrical signals from said combination to the picture tube in control of modulation of scanning electrons therein.

3. Television apparatus as set forth in claim 2 wherein one of said different alternate spacings is of substantially the duration of one line scan for the picture tube, wherein the other of said different alternate spacings is of substantially the duration of two line scans for the picture tube, and wherein said pulses are of duration not in excess of the time between successive line scans.

4. Television apparatus as set forth in claim 3 wherein said driving means increases the resonant frequency of said combination by decreasing the effective inductance of said inductive means.

5. Television apparatus as set forth in claim 4 wherein said capacitance includes capacitance between an electron-beam modulating electrode of the picture tube and another structure, and wherein said inductive means and capacitance are in parallel-circuit combination.

6. Television apparatus as set forth in claim 5 wherein said inductive means includes one inductance portion thereof in said parallel-circuit combination and another portion thereof inductively coupled with said one portion, and wherein said driving means excites said other portion of said inductive means to increase the resonant frequency of said combination and to supply electrical energy thereto.

7. Television apparatus as set forth in claim 6 further comprising a source of unidirectional high voltage, and means applying to said modulating electrode voltages from said resonant-circuit combination superimposed upon said high voltage, and wherein said modulating electrode comprises an electron-beam accelerating electrode in the picture tube.

8. Television apparatus as set forth in claim 6 wherein said driving means shock-excites said other portion of said inductive means alternately with pulses of electrical energy which induce voltages of opposite polarities in said one portion of said inductive means.

9. Television apparatus as set forth in claim 8 wherein said inductive means includes at least one further inductance portion having nonsymmetrical electrical signals induced therein as the result of couplings thereof with said one and other inductance portions of said inductive means, and means responsive to different pulsations of said electrical signals induced in said further inductance portion separately gating the couplings of different color-characterizing signals to intensity-controlling electrode structure of the picture tube.

10. Color television apparatus wherein scanning electrons in a color picture tube are modulated to produce displays in color, comprising inductance means having at least one portion thereof in resonant-circuit combination with capacitance, said inductance means further including at least another portion inductively coupled with said one portion, means for driving through said other portion separate pulses of current which induce voltages in said one portion of opposite polarities while at the same time lowering the inductance of said one portion, means exciting said driving means to drive said pulses of current through said other portion in a predetermined nonsymmetrical alternation wherein the durations of said pulses are short in relation to both of the different alternating spacings therebetween, a source of unidirectional high voltage, and means applying to an accelerating electrode of the picture tube voltages from said resonant-circuit combination superimposed upon said high voltage.

11. Color television apparatus as set forth in claim 10 wherein said capacitance includes capacitance between an electron-beam accelerating anode of the picture tube and a ground reference, and wherein said one portion of said inductance means is in parallel-circuit relationship with said capacitance.

12. Color television apparatus as set forth in claim 11 wherein one of said different alternating spacings is of substantially the duration of one line scan for the picture tube, wherein the other of said different alternating spacings is of substantially the duration of two line scans for the picture tube, and wherein said pulses of current are of duration not substantially in excess of the time between successive line scans.

13. Color television apparatus as set forth in claim 12 wherein the picture tube includes a target assembly having phosphor means covering a raster area and emissive of light of different predetermined wavelengths responsive to impingements of the scanning electrons under control of different predetermined voltages applied to said accelerating anode, and means synchronizing the operations of said exciting means with horizontal synchronizing pulses derived from received television signals.

14. Color television apparatus as set forth in claim 13 wherein said inductance means comprises a transformer, said one and other portions thereof comprising output and exciting winding portions, respectively, inductively coupled with one another.

15. Color television apparatus as set forth in claim 14 wherein the output voltages from the output winding portion of said transformer are alternately of levels which, when superimposed upon said high voltage, produce resultant voltages at said accelerating electrode equal to said different predetermined voltages.

16. Color television apparatus as set forth in claim 15 wherein said means applying said voltages to said accelerating electrode includes means connecting said source of unidirectional high voltage to said anode, and capacitor means applying high-frequency outputs from output winding portion to said anode while blocking said source of unidirectional high voltage from said output winding portion.

17. Color television apparatus as set forth in claim 16, wherein said means connecting said source of unidirectional high voltage to said anode includes high-frequency choke means.

18. Color television apparatus as set forth in claim 14 wherein said driving means comprises current supply means, and electronic valving means selectably excitable to pass said current from said supply means through said exciting winding portion of said transformer and thereby to produce said current pulses, and wherein said exciting means comprises means electrically biasing said valving means to conduct said current pulses in said alternation.

19. Color television apparatus as set forth in claim 18 wherein said supply means comprises a low-impedance source of unidirectional voltage, wherein said electronic valving means comprises a pair of semiconductor current-controlling devices each adapted to conduct current flow therethrough separately responsive to electrical biasing thereof into a conductive state, means connecting each of said devices in a different circuit relationship with said exciting winding portion of said transformer and with said source to control the flow of different ones of said separate pulses of current through said exciting winding portion, and wherein said synchronizing means comprises means electrically biasing said devices alternately into conduction separately each for said duration of said pulses of current and in said predetermined nonsymmetrical alternation.

20. Color television apparatus as set forth in claim 19 wherein each of said devices comprises a normally nonconductive transistor, wherein said synchronizing means comprises pulse-generating means producing output pulses of different polarities synchronously with every third one of said horizontal synchronizing pulses, means applying as electrical biasing to one of said transistors said output pulses of one polarity which bias said one of said transistors into a conductive state, means applying as electrical biasing to the other of said transistors said output pulses of another polarity which inhibit conduction by said other of said transistors, means applying to said other of said transistors pulses synchronized with each of said horizontal synchronizing pulses and promoting conduction of said other of said transistors in the absence of said output pulses which inhibit said conduction by said other of said transistors, and diode means interposed between said other of said transistors and said exciting winding portion of said transistors and polarized to block conduction by said other of said transistors when voltage is induced in said exciting winding portion by currents flowing in said output winding portion after each conduction by said other of said transistors and before the next conduction by said one of said transistors, whereby said one of said transistors is rendered conductive briefly in synchronism with every third horizontal synchronizing pulse and said other of said transistors is rendered conductive briefly in synchronism with every horizontal synchronizing pulse immediately following said third synchronizing pulses.

21. Color television apparatus as set forth in claim 20 wherein said pulse-generating means comprises a divide-by-three circuit in the form of a relaxation oscillator including a charging capacitor and a voltage-breakdown device discharging said capacitor and producing said output pulses in response to each discharge thereof, said oscillator having a natural periodicity slightly in excess of the interval encompassed by three successive horizontal synchronizing pulses, and means applying pulses related to said horizontal synchronizing pulses to said voltage-breakdown device in combination with voltage on said charging capacitor to promote breakdown thereof, the charging rate of said capacitor and the voltage level of said pulses related to said horizontal synchronizing pulses being selected to produce in combination a voltage causing discharge of said capacitor only in response to each third successive one of said pulses related to said synchronizing pulses, whereby each third successive one of said horizontal synchronizing pulses causes discharge of said capacitor through said voltage-breakdown device and thereby synchronizes said output pulses with said third successive ones of said horizontal synchronizing pulses.

22. Color television apparatus as set forth in claim 19 wherein said inductance means includes at least one further inductance portion having nonsymmetrical voltage pulses of different durations and polarities induced therein as the result of couplings thereof with said one and other portions of said inductance means, and means responsive to said voltage pulses induced in said further inductance portion separately gating the couplings of different color-characterizing signals to intensity-controlling electrode structure of the color picture tube.

23. Color television apparatus for reproducing a subject as a display in color, comprising cathode ray tube means having electron gun means and a target assembly, said target assembly including first and second phosphor materials covering a raster area and emissive of visible light of first and second wavelengths, respectively, in response to impingements of electrons thereon of electrons having at least a first relatively low predetermined kinetic energy and at least a second relatively high predetermined kinetic energy, respectively, means producing first and second electrical signals characterizing the lightness distributions in a televised scene as they appear in terms of first and second predetermined light wavelengths, respectively, transformer means having an exciting winding portion and at least two output winding portions, means connecting one of said output winding portions in a parallel resonant-circuit combination with capacitance including the capacitance between an accelerating anode of said cathode ray tube means and a ground reference, normally non-conducting electrical valving means for conducting through said exciting winding portion different unidirectional currents which induce voltages of different polarities in said output winding portions, means synchronized with horizontal synchronizing pulses from received television signals energizing said valving means to conduct said different currents in alternation during brief intervals synchronized with the first and second, respectively, of every three successive horizontal synchronizing pulses, said intervals not being in excess of the time between successive line scans in said cathode ray tube means, a source of unidirectional high voltage, means applying said high voltage to said anode in superimposed relation to nonsymmetrically alternated voltage pulses developed across said one of said output winding portions, and means independently gating said first and second electrical signals to electron-beam intensity controlling electrode structure in said cathode ray tube means responsive to output pulses of different polarities from the other of said output winding portions, whereby the gatings of said signals are synchronized with the changes in voltages appearing at said anode.

No references cited.

ROBERT L. GRIFFIN, *Primary Examiner.*

R. MURRAY, *Assistant Examiner.*